(12) United States Patent  
Lanter et al.

(10) Patent No.: US 8,796,571 B2
(45) Date of Patent: Aug. 5, 2014

(54) SWITCH FOR A BELT LOCK

(75) Inventors: Josua Lanter, Chur (CH); Antonino Spataro, Vilters (CH)

(73) Assignee: Polycontact AG, Chur (CH)

( * ) Notice: Subject to any disclaimer, the term of this patent is extended or adjusted under 35 U.S.C. 154(b) by 122 days.

(21) Appl. No.: 13/495,587

(22) Filed: Jun. 13, 2012

(65) Prior Publication Data

US 2012/0318646 A1 Dec. 20, 2012

(30) Foreign Application Priority Data

Jun. 17, 2011 (CH) ...................................... 1032/11

(51) Int. Cl.
*A44B 11/25* (2006.01)

(52) U.S. Cl.
USPC ...................................................... 200/61.52

(58) Field of Classification Search
USPC ........................ 200/61.58 B, 61.58 R; 701/45
IPC ................. B60R 22/48,2022/4816; H01H 3/16, H01H 35/003, 15/00, 15/02
See application file for complete search history.

(56) References Cited

U.S. PATENT DOCUMENTS

| 5,590,904 A * | 1/1997 | Ellis et al. ...................... 280/735 |
| 7,084,362 B2 * | 8/2006 | Ebert ...................... 200/61.58 B |
| 2005/0146420 A1 | 7/2005 | Ebert |
| 2012/0188070 A1 * | 7/2012 | Lanter ........................ 340/457.1 |

FOREIGN PATENT DOCUMENTS

| EP | 0 861 763 A2 | 9/1998 |
| EP | 1 485 276 B1 | 8/2006 |

* cited by examiner

*Primary Examiner* — Vanessa Girardi
(74) *Attorney, Agent, or Firm* — Buchanan Ingersoll & Rooney PC

(57) ABSTRACT

A switch is provided for a belt lock of a safety belt system, for example, in a motor vehicle. The switch includes a switch housing which has a contact space in which two contact sheets interact, and a channel which borders the contact space and in which a slide can be moved. A section of the contact sheet made as a contact spring projects into the channel, as a free end section which projects beyond one contact region of the contact sheets. A connecting opening is located in a position of use of the switch above the contact region of the two contact sheets.

17 Claims, 2 Drawing Sheets

SWITCH FOR A BELT LOCK

RELATED APPLICATION(S)

This application claims priority under 35 U.S.C. §119 to European Patent Application No. 01032/11 filed in Switzerland on Jun. 17, 2011, the entire content of which is hereby incorporated by reference in its entirety.

FIELD

The present disclosure relates to a switch for a belt lock of a safety belt system, for example in a motor vehicle.

BACKGROUND INFORMATION

In technical applications such as, for example, motor vehicle construction and the like, it is often necessary to quickly and reliably detect the location of a component which can be moved into two end positions relative to a stationary part using measurement engineering. In the case of a belt lock of a safety belt system, for example, in a motor vehicle, it has to be checked whether a passenger is belted or not. Knowledge of the locking state of the belt lock is necessary to notify the passengers by a signal to put on and lock the safety belts. Since the introduction of the safety airbag, information about the locking state of the safety belts has also been important for activation or deactivation of mechanisms for inflating driver and passenger airbags as well as side and head airbags.

Known techniques disclose, for example, Hall sensors for contactless monitoring of components which change their position, especially which can assume two different end positions. Hall sensors consist in principle of a semiconductor layer which is supplied with constant current, generally in an integrated construction. The constant current is influenced by a magnetic field component perpendicular to the semiconductor layer, and the sensor delivers a Hall voltage which can be evaluated, which can be tapped and which can be used for evaluating a state and also directly as switching voltage. The integrated construction of Hall sensors allows for the integration of an evaluation circuit which is suitable for evaluating the operating state on the Hall sensor. Therefore, in the automobile industry, Hall sensors are used as contactless state sensors in many applications.

EP-A-0 861 763 discloses a belt lock with an integrated, biased Hall sensor which detects, without contact, the state of a locking body or an ejector for a lock tongue which has been inserted into a belt lock. Here, a Hall sensor with a Hall field is located in direct proximity to a permanent magnet. By changing the location of the locking body or of the ejector which for this purpose consists of a ferromagnetic material, the magnetic field of the permanent magnet is changed. In doing so, the signal of the Hall sensor changes and at the output of the Hall sensor the state change can be tapped as a voltage change. In one alternative version, it is suggested that the Hall sensor with a Hall field be installed without a permanent magnet and for this purpose the locking body or the ejector be made as permanent magnets. In this arrangement, the change of the position of the locking body or of the ejector should also be detectable by a change of the Hall voltage.

A drawback in the belt lock according to EP-A-0 861 763 is that the Hall sensor must be positioned very carefully with respect to the locking element or the ejector. Subsequent installation of the Hall sensor is therefore relatively complex and expensive. Depending on its arrangement, the Hall sensor is also sensitive to stray external magnetic fields which can be caused, for example, by a magnetic key chain. Optionally, even additional shielding must be mounted, which makes mounting or installation even more complicated. The susceptibility to stray external fields is also increased by the signal changes being relatively small due to the comparatively short distances which are traversed by the locking body or the ejector when closing or opening the safety belt lock. The belt lock version without a biased Hall sensor, in which either the locking body or the ejector are made as a permanent magnet, is less practicable. The attainable signal changes are also relatively small here; this makes detection of different states difficult, whether the belt lock is open or closed. Over time, the permanent magnet can be demagnetized due to vibrations of the locking body and of the ejector when the safety belt is open or closed. This can ultimately lead to the Hall sensor becoming ineffective and the state changes of the belt lock no longer being able to be reliably detected.

The known belt locks all have a very compact construction. The space available within the belt lock is therefore generally very limited. This makes it difficult to arrange the sensor components within the belt lock housing, especially in the vicinity of a component which, when the belt lock is activated, changes its position from one end position into the other end position. If shields are also then to be mounted, the designer is generally faced with an essentially insoluble problem since the dimensions of the belt lock housing are not to be changed.

EP-1 485 276 B1 discloses a mechanical switch which can be used as a sensor for monitoring the locking state of a belt lock. The switch has two contact sheets which are arranged in a switch housing. The contact-making regions of the contact sheets are located in any upper housing interior of the switch housing. One of the contact sheets is made as a contact spring with a hammer-shaped region on the contact-making end which interacts with a fork-shaped contact-making end of the fixed contact sheet. The contact spring has a middle, arc-shaped region which projects into a channel which is provided laterally from the housing interior. The contact of the two contact sheets is closed or opened by moving a slide in the channel.

This known mechanical switch is insensitive to stray electromagnetic fields. It does not have any permanent magnets either which could become demagnetized as a result of the vibration over time and thus which could adversely affect the operation of the sensor. The known mechanical switch is one which is made comparatively compact and can be housed in various belt lock versions without the need for major modifications on the belt lock housing or on the belt lock itself. A drawback in the known mechanical switch is the relatively complex shape of the contact sheets which requires a very accurate calibration to one another. The middle arc-shaped region of the contact sheet which is made as contact spring must be made very exactly so that the operation of the switch is ensured. The hammer-shaped contact region adjoining it requires relatively high precision so that contact with the fork-shaped contact regions of the stationary contact sheet is ensured. Providing an upper housing interior for the contact-making regions of the contact sheets which is designed to prevent any penetration of foreign bodies dictates a switch housing of complex shape. In order to achieve the required precision, a relatively high production effort must be exerted which has adverse effects on the costs for the switch.

SUMMARY

An exemplary embodiment of the present disclosure provides a switch for a belt lock of a safety belt system. The exemplary switch includes contact sheets, and a slide. The exemplary switch also includes a switch housing having a contact space in which the contact sheets interact, and a channel which borders the contact space and in which the slide is configured to be moved. One of the contact sheets is made as a contact spring and has a section which projects through a connecting opening into the channel and interacts with the slide such that when the slide is moved, a contact between the contact sheets is configured to be switched. The section of the contact sheet which is made as a contact spring and which projects into the channel is a free end section which projects beyond a contact region of the contact sheets. The connecting opening is located in the position of use of the switch above the contact region of the two contact sheets.

BRIEF DESCRIPTION OF THE DRAWINGS

Additional refinements, advantages and features of the present disclosure are described in more detail below with reference to an exemplary embodiment illustrated in the drawing, in which.

DETAILED DESCRIPTION

Figure 1:
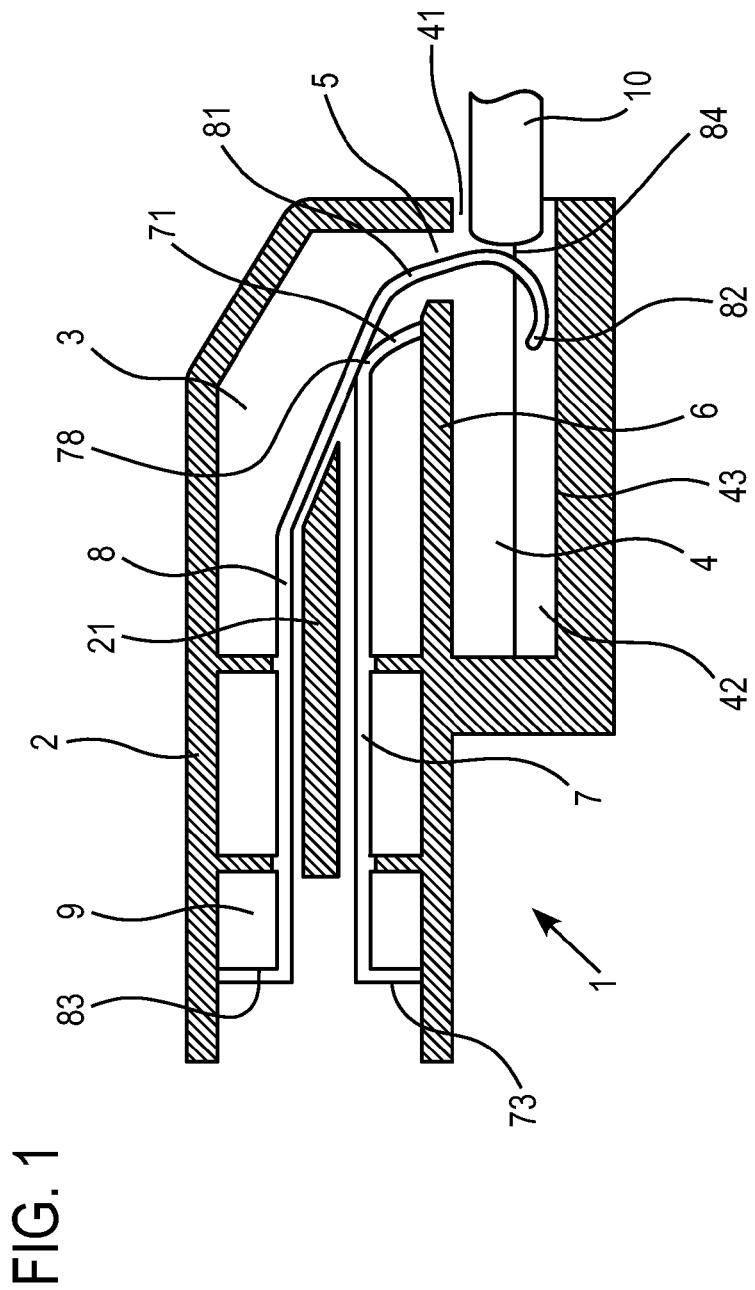
FIG. 1 illustrates a mechanical switch which can be used as a sensor for monitoring the locking state of a belt lock of safety belt system.

Exemplary embodiments of the present disclosure provide a mechanical switch which can be used as a sensor for monitoring the locking state of a belt lock of a safety belt system and, in contrast to the known switch, has a simpler mechanical structure. The switch of the present disclosure is simple and economical to produce and allows for an especially simple and automatic assembly. The switch should be built as compactly as possible and allow integration into existing belt lock structures without changes in the belt lock housing being necessary for that purpose.

The switch of the present disclosure can be utilized as a switch for a belt lock of a safety belt system, for example in a motor vehicle. Additional developments and/or advantageous versions of the present disclosure are described in more detail below.

An exemplary embodiment of the present disclosure provides a switch for a belt lock of a safety belt system, for example in a motor vehicle, which has a switch housing which has a contact space in which two contact sheets interact, and a channel which borders the contact space and in which a slide can be moved. One of the contact sheets is made as a contact spring and has a section which projects through a connecting opening into the channel and interacts with the slide such that when the slide is moved the contact between the contact sheets can be switched. The section of the contact sheet which is made as a contact spring, which section projects into the channel, is a free end section which projects beyond one contact region of the contact sheets. The connecting opening is located in the position of use of the switch above the contact region of the two contact sheets.

The switch according to the present disclosure is characterized by its especially simple construction. The contact sheets have a very simple shape. The switch is actuated via the free end region of the contact sheet which is made as a contact spring and which projects into the channel which borders the contact space for the slide. Middle sections of the contact sheet which is made specially curved can thus be omitted. This simplifies the construction of the switch housing. By the free end region of the contact spring interacting with the slide the connecting opening between the contact space and the channel through which the free end region of the contact spring is guided can be arranged such that it is located in the position of use of the switch above the contact region of the contact sheets. This is easily implemented in that the partition between the contact space and the channel is not routed as far as the upper end wall of the switch housing, but with the formation of the connecting opening ends roughly 2 mm to 6 mm ends before. The entry of foreign bodies into the contact space and to the contact region of the contact sheets is largely prevented by the free end region of the contact spring which projects beyond the contact region. The switch housing is very simple and economical to produce in a mass production method, for example in an injection molding method. The contact sheets can be produced easily and economically as a result of their simple shape. As a result of its shaping, they can also be very easily mounted in the switch housing and this process can also be very easily automated.

In accordance with an exemplary embodiment of the present disclosure, the free end section of the contact sheet which is made as a contact spring is curved in an arc shape. The curvature of the free end section runs such that its free end faces away from an entry opening into the channel. Made in this way, the free end section which projects into the channel does not hinder the displacement motion of the slide in the channel.

By the curvature of the end section of the contact sheet which is made as a contact spring being made such that a stop bevel facing the entry opening into the channel extends into the channel, the slide slides very easily under the bevel. In its continuing displacement motion the slide lifts the contact region and in this way actuates the switch.

In accordance with an exemplary embodiment, the channel provided in the switch housing for the slide has at least one longitudinal side which is made open. This facilitates the entry of the slide into the channel in order to interact with the free end region of the contact sheet which is made as a contact spring, which end region projects into the channel.

On one of the longitudinal sides of the channel there can be a guide which runs in the longitudinal direction for the slide. This facilitates the displacement of the slide in the channel.

In accordance with an exemplary embodiment of the switch of the present disclosure, the free end section of the contact sheet which is made as a contact spring, which end section projects over the contact region of the two contact sheets, has a width which corresponds essentially to the width of the connecting opening into the channel. In this way the free end section overlaps the connecting opening and largely prevents penetration of foreign bodies into the contact space. Here, the free end section however still has enough play to allow unobstructed motion.

To further simplify its production, the contact sheet which is made as a contact spring can have essentially the same width over its entire longitudinal extension.

In accordance with an exemplary embodiment, for simplification of production of the switch housing and for simpler mounting of the contact sheets in the housing, if the contact sheet which forms a fixed contact at least in the contact region has a width which corresponds essentially to that of the contact sheet which is made as a contact spring. According to an exemplary embodiment, the two contact sheets have the same width over their entire longitudinal extension.

An exemplary embodiment of the switch provides for the contact sheet which forms the fixed contact to have a double contact tongue region which is made fork-shaped. The double contact tongue region also provides for reliable contact even for contact sheets which are slightly twisted in the longitudinal direction. According to an exemplary embodiment, for this purpose, the double contact tongue regions of the fixed contact have curved end regions which are supported with their free ends on a longitudinal wall which separates the contact space and the channel. In this way, the double contact tongue regions also have a certain elastic pretensioning. When the contact with the contact sheet which is made as a contact spring is opened and closed, as a result of the flexing of the double contact tongue region, contact friction occurs. This leads to a certain self-cleaning in the contact region.

An exemplary embodiment of the present disclosure provides for the switch to be made as a break contact and for the contact sheet which is made as a contact spring to be elastically pretensioned in the closing direction relative to the contact sheet which forms the fixed contact. The pretensioning in the closing direction when the belt lock is open as well as closed prevents rattling noise of the switch.

To simplify mounting of the switch and especially to facilitate the connection of cables to the switch, the switch housing on its end opposite the contact space has a connection space which is made open on the end side and into which the connection regions for the cables of the two contact sheets project. The cables are then connected easily by soldering.

An exemplary embodiment of the present disclosure provides for a method of using the switch in a belt lock for detection of the locking state. The exemplary method includes generating an optical and/or acoustic warning signal for the passengers for example of a motor vehicle to buckle up. Furthermore, the switch can also be used for activation or deactivation of mechanisms for inflating airbags for the passengers of a motor vehicle. One skilled in the art also gains access to a plurality of other possible applications which would exceed the scope of this application to enumerate.

Other advantages and features of the disclosure will become apparent from the following description of a schematic section of an exemplary embodiment of the switch, which is not to scale in the drawing.

The exemplary embodiment of the switch which is shown in the drawings is labeled with reference number 1 overall. As illustrated in FIG. 1, the switch 1 has a switch housing 2 in which there is a contact space 3. Within the contact space 3 there is one contact region 78 of two contact sheets 7, 8 which are mounted in the switch housing 2. Laterally next to the contact space 3, there is provided a channel 4 with an entry opening 41 for a slide 10. One longitudinal wall 6 separates the contact space 3 from the channel 4. The slide 10 is, for example, one component of a closure mechanism of a belt lock of a safety belt system and when the closure mechanism is actuated can be moved between two end positions. The channel 4 is made open on its longitudinal sides 43. The channel 4 has a lateral guide 42 for the inserted slide 10 on one of the longitudinal sides 43.

Figure 2A:
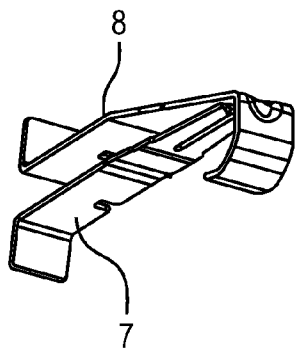
FIG. 2A illustrates a perspective view of the contact sheet which is made as a contact spring and the contact sheet which is made as a fixed contact in a working configuration.

The two contact sheets 7, 8 extend in the longitudinal direction of the switch housing 2. They have two connection regions 73, 83 which are located in a connection space 9 on the end of the switch housing 2 facing away from the entry opening 41 into the channel 4. The end side of the switch housing 2 facing away from the entry opening 41 is made open and allows unobstructed access to the connection space 9, for example, in order to solder the ends of electrical conductor cables to the connection regions 73, 83 of the contact sheets 7, 8. The contact sheet 7 which is nearer the longitudinal wall 6 is made as a fixed contact. It has an end region 71 which is made curved and which is supported on the longitudinal wall 6. In accordance with an exemplary embodiment, the contact sheet 7 which forms the fixed contact has a double contact tongue region which is made in a fork shape (see FIGS. 2D and 2E).

The second contact region 8 is made as a contact spring. A contact sheet partition 21 which is provided in the switch housing 2 separates the two contact sheets 7, 8 up to their contact region 78.

The contact sheet 8 which is made as a contact spring has an end section 81 which extends beyond the contact region 78 of the two contact sheets 7, 8 and which projects into the channel 4 through a connecting opening 5. The connecting opening 5 is formed by the longitudinal wall 6 between the contact space 3 and the channel 4 not running as far as the face end of the switch housing in which the entry opening 41 into the channel 4 is provided. The extension of the connecting opening 5 which is measured in the longitudinal direction of the switch housing 2 is, for example, about 2 mm to about 6 mm. In the position of use of the switch 1, the connecting opening 5 is located above the contact region 78 of the two contact sheets 7, 8. The end section 81 of the contact sheet 8 which is made as a contact spring, which section projects into the channel 4, is curved in an arc shape. Its free end 82 is facing away from the entry opening 41 into the channel 4 and projects into the interior of the channel 4.

The curvature of the end section 81 runs such that a stop bevel 84 which extends into the interior of the channel 4 offers itself to the oncoming slide 10.

Figure 2B:
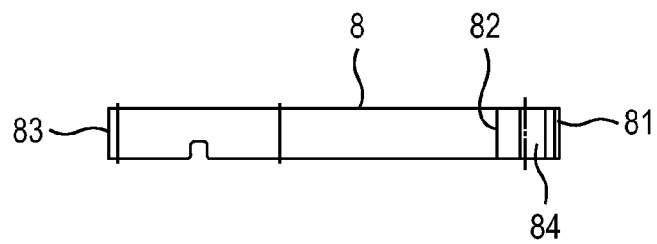
FIGS. 2B-2C illustrate perspective views of the contact sheet which is made as a contact spring.
Figure 2C:
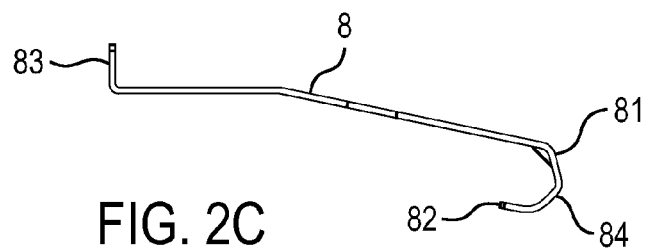
Figure 2D:
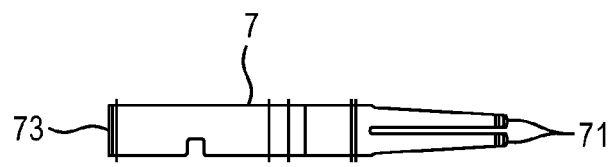
FIGS. 2D-2E illustrate perspective views of the contact sheet which is made as a fixed contact.
Figure 2E:
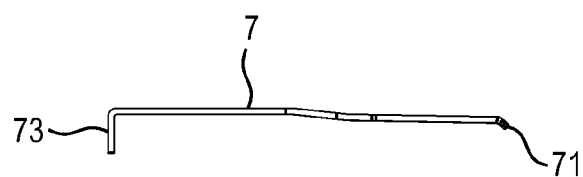

The end section 81 which projects over the contact region 78 of the two contact sheets has a width which corresponds approximately to the width of the connecting opening 5 between the contact space 3 and the channel 4. The end section 81 always has enough play so that unobstructed movement in the connecting opening is ensured. In accordance with an exemplary embodiment, the two contact sheets 7, 8 have the same width over their entire longitudinal extension. This can be, for example, 1.5 mm to 5 mm. As illustrated in FIGS. 2B and 2C, the contact sheet 8 which is made as a contact spring has essentially the same width over its entire longitudinal extension.

The switch 1 which is made as a break contact is actuated by the interaction of the slide 10 which has been inserted into the channel 4 with the curved end section 81 of the contact sheet 8 which is made as a contact spring. Upon insertion, this sheet 8 is raised against its inherent spring force by the slide 10. In this way in the contact region 78 the contact between the two contact sheets 7, 8 is interrupted. If the slide 10 is moved out of the channel 4 again, the contact spring 8 rebounds again against the fixed contact 7 and closes the contact. As illustrated in FIG. 2A, the contact sheet 8 which is made as a contact spring is elastically pretensioned (biased) in a closing direction relative to the contact sheet 7 which forms the fixed contact.

The signal which has been obtained by actuating the switch 1 in a belt lock is an indicator for the locking state of the belt lock. The information obtained by the switch about the state of the belt lock can be used, for example, for a belt warning display by an optical and/or acoustic warning signal being generated which indicates to the passenger or passengers of a motor vehicle to fasten belts, depending on the detected locking state. Furthermore, the signal which has been obtained via the actuation of the switch 1 can also be used for activation or deactivation of mechanisms for inflating airbags for the passengers of a motor vehicle. If there is no passenger in the vehicle, the airbags on the passenger side can be deactivated based on the detected locking state (open).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A switch for a belt lock of a safety belt system, the switch comprising:
    contact sheets;
    a slide; and
    a switch housing having a contact space in which the contact sheets interact, and a channel which borders the contact space and in which the slide is configured to be moved, wherein:
    one of the contact sheets is made as a contact spring and has a section which projects through a connecting opening into the channel and interacts with the slide such that when the slide is moved, a contact between the contact sheets is configured to be switched;
    the section of the one of the contact sheets which is made as a contact spring and which projects into the channel is a free end section which projects beyond a contact region of the contact sheets; and
    the connecting opening is located in the position of use of the switch above the contact region of the two contact sheets.

2. The switch as claimed in claim 1, wherein the switch is made as a break contact, and the one of the contact sheets which is made as a contact spring is elastically biased in a closing direction relative to another one of the contact sheets which forms a fixed contact.

3. The switch as claimed in claim 1, wherein the switch housing on its end opposite the contact space has a connection space which is made open on the end side and into which connection regions of the two contact sheets project.

4. The switch as claimed in claim 1, wherein the switch is configured to generate at least one of an optical warning signal and an acoustic warning signal in a safety belt system.

5. The switch as claimed in claim 1, wherein the switch is configured to generate a signal to at least one of activate and deactivate inflation of airbags for passengers of a motor vehicle.

6. The switch as claimed in claim 1, wherein another one of the contact sheets which forms a fixed contact includes a double contact tongue region which is made fork-shaped.

7. The switch as claimed in claim 6, wherein the double contact tongue regions of the fixed contact have curved end regions, and the free ends are supported on a longitudinal wall which separates the contact space and the channel.

8. The switch as claim 1, wherein the channel has at least one longitudinal side which is made open.

9. The switch as claimed in claim 8, comprising:
    a guide on one of the longitudinal sides of the channel, the guide running in the longitudinal direction for the slide.

10. The switch as claimed in claim 9, wherein the one of the contact sheets which is made as a contact spring has essentially the same width over its entire longitudinal extension.

11. The switch as claimed in claim 1, wherein the free end section of the one of the contact sheets which is made as a contact spring is curved in an arc shape, the free end of the free end section facing away from an entry opening into the channel.

12. The switch as claimed in claim 11, wherein the curvature of the end section of the one of the contact sheets which is made as a contact spring is made such that a stop bevel facing the entry opening into the channel extends into the channel.

13. The switch as claim 12, wherein the channel has at least one longitudinal side which is made open.

14. The switch as claimed in claim 13, comprising:
    a guide on one of the longitudinal sides of the channel, the guide running in the longitudinal direction for the slide.

15. The switch as claimed in claim 12, wherein the switch is made as a break contact, and the one of the contact sheets which is made as a contact spring is elastically biased in a closing direction relative to another one of the contact sheets which forms a fixed contact.

16. The switch as claimed in claim 12, wherein another one of the contact sheets which forms a fixed contact includes a double contact tongue region which is made fork-shaped.

17. The switch as claimed in claim 16, wherein the double contact tongue regions of the fixed contact have curved end regions, and the free ends are supported on a longitudinal wall which separates the contact space and the channel.

* * * * *